(12) United States Patent
Porte et al.

(10) Patent No.: US 11,073,081 B2
(45) Date of Patent: Jul. 27, 2021

(54) AIR INLET LIP OF AN AIRCRAFT ENGINE COMPRISING A DE-ICING SYSTEM

(71) Applicant: Airbus Operations S.A.S., Toulouse (FR)

(72) Inventors: Alain Porte, Colomiers (FR); Vincent Rebeyrotte, Colomiers (FR); Gregory Albet, Grepiac (FR); Jonathan Carcone, Toulouse (FR)

(73) Assignee: Airbus Operations S.A.S.

( * ) Notice: Subject to any disclaimer, the term of this patent is extended or adjusted under 35 U.S.C. 154(b) by 139 days.

(21) Appl. No.: 16/145,367

(22) Filed: Sep. 28, 2018

(65) Prior Publication Data
US 2019/0112065 A1 Apr. 18, 2019

(30) Foreign Application Priority Data

Oct. 18, 2017 (FR) ...................................... 1759798

(51) Int. Cl.
*F02C 7/047* (2006.01)
*F02C 7/04* (2006.01)
*B64D 33/02* (2006.01)

(52) U.S. Cl.
CPC ................ *F02C 7/047* (2013.01); *F02C 7/04* (2013.01); *B64D 2033/0233* (2013.01)

(58) Field of Classification Search
CPC .... F02C 7/047; F02C 7/04; B64D 2033/0233; B64D 33/02; F01D 25/02
See application file for complete search history.

(56) References Cited

U.S. PATENT DOCUMENTS

| | | | | |
|---|---|---|---|---|
| 5,088,277 A * | 2/1992 | Schulze | .................. | F02C 7/047 60/39.093 |
| 6,079,670 A * | 6/2000 | Porte | ..................... | B64D 15/04 165/170 |
| 6,193,192 B1 * | 2/2001 | Porte | ..................... | F02C 7/047 244/134 B |

(Continued)

FOREIGN PATENT DOCUMENTS

| | | |
|---|---|---|
| EP | 1 479 889 A2 | 11/2004 |
| FR | 2 987 602 A1 | 9/2013 |

OTHER PUBLICATIONS

The Jet Engine, Jet Engine (Rolls Royce), Derby, Rolls Royce PLC, GB (Jan. 1, 1986) pp. 147-151, Fig.13-3 p. 149.

*Primary Examiner* — William H Rodriguez
(74) *Attorney, Agent, or Firm* — Lerner, David, Littenberg, Krumholz & Mentlik, LLP

(57) ABSTRACT

An aircraft engine air inlet lip takes an annular form about a longitudinal axis and delimits an air inlet stream, and includes: a wall having a U-shaped profile having an outer face oriented towards outside of the air inlet lip and an inner face oriented towards interior of the air inlet lip, an inner wall extending inside the wall between two zones of the inner face, so as to close an inner chamber delimited between the wall and the inner wall and filled with a gas, the inner wall having an upstream face oriented towards and a downstream face oriented away from the inner chamber, a fan configured to move the gas contained in the inner chamber, and at least one pipeline fixed to the upstream face and extending all around the air inlet lip and configured to be fed with a heat transfer fluid heated by a heat source.

7 Claims, 2 Drawing Sheets

(56) References Cited

U.S. PATENT DOCUMENTS

| | | | | |
|---|---|---|---|---|
| 6,241,189 B1* | 6/2001 | Porte | ...................... | B64D 15/04 |
| | | | | 244/134 B |
| 6,267,328 B1* | 7/2001 | Vest | ...................... | B64D 15/04 |
| | | | | 239/599 |
| 2002/0027180 A1* | 3/2002 | Porte | ...................... | B64D 15/04 |
| | | | | 244/134 R |
| 2002/0148929 A1* | 10/2002 | Andre | .................... | B64D 15/04 |
| | | | | 244/134 R |
| 2008/0149771 A1* | 6/2008 | Zanarelli | ................ | B64D 33/02 |
| | | | | 244/134 R |
| 2009/0152401 A1* | 6/2009 | Sternberger | ........... | B64D 33/02 |
| | | | | 244/134 B |
| 2010/0200699 A1* | 8/2010 | Porte | ...................... | F02C 7/047 |
| | | | | 244/134 B |
| 2010/0242428 A1* | 9/2010 | Vauchel | ................ | B64D 15/04 |
| | | | | 60/39.093 |
| 2011/0133025 A1* | 6/2011 | Vauchel | ................ | B64D 33/02 |
| | | | | 244/1 N |
| 2011/0226903 A1* | 9/2011 | Porte | ...................... | B64D 33/02 |
| | | | | 244/134 B |
| 2012/0248249 A1* | 10/2012 | Hormiere | .............. | B64D 15/04 |
| | | | | 244/134 B |
| 2014/0263837 A1* | 9/2014 | Sternberger | ........... | B64D 15/04 |
| | | | | 244/134 B |
| 2014/0369812 A1 | 12/2014 | Caruel et al. | | |
| 2015/0377132 A1* | 12/2015 | Caruel | .................... | F01D 25/12 |
| | | | | 415/116 |
| 2017/0058772 A1* | 3/2017 | Frank | ...................... | F01D 25/02 |
| 2019/0118955 A1* | 4/2019 | Porte | ...................... | B64D 29/00 |
| 2019/0195085 A1* | 6/2019 | Vinches | ................ | F01D 21/045 |

* cited by examiner

AIR INLET LIP OF AN AIRCRAFT ENGINE COMPRISING A DE-ICING SYSTEM

FIELD OF THE INVENTION

The present invention relates to an air inlet lip for an aircraft engine, the lip being equipped with a de-icing system. The invention relates also to an aircraft engine comprising such a lip and an aircraft comprising at least one such engine.

BACKGROUND OF THE INVENTION

An aircraft engine comprises a core and a nacelle which surrounds the core and which has, at the front, an air inlet lip which channels the air to an air inlet stream to direct the air to the core. This lip is exposed to cold air and ice can form thereon. To avoid this formation of ice, it is known practice to circulate hot air or a heat transfer fluid inside the lip. For this, the hot air or the heat transfer fluid is heated generally at the compression stages of the core and transported to the interior of the lip where it circulates.

The lip is composed of a U-shaped wall whose aperture is oriented towards the rear of the aircraft and whose bottom forms the leading edge of the lip. The wall has an outer face oriented towards the outside and in contact with the outside air, and an inner face oriented towards the interior of the lip.

In the case where the heat transfer fluid is a liquid, the interior of the lip is equipped with a pipeline which is applied against the inner face of the wall.

The wall and the pipeline are thus strongly integrated with one another, and, in case of needing to replace one of these elements, it is difficult to change this element without having to change the other, which generates significant maintenance costs and times.

BRIEF SUMMARY OF THE INVENTION

An aspect of the present invention proposes an inlet lip for an aircraft engine which comprises a heat transfer fluid circuit and whose method of assembly facilitates maintenance.

An air inlet lip is proposed for an engine of an aircraft, said air inlet lip taking an annular form about a longitudinal axis X and delimiting an air inlet stream, said air inlet lip comprising:
- a wall having a U-shaped profile having an outer face oriented towards the outside of the air inlet lip and an inner face oriented towards the interior of the air inlet lip,
- an inner wall extending inside the wall between two zones of the inner face, so as to close an inner chamber delimited between the wall and the inner wall and filled with a gas, the inner wall having an upstream face oriented towards the inner chamber and a downstream face oriented away from the inner chamber,
- a fan configured to move the gas contained in the inner chamber, and
- at least one pipeline fixed to the upstream face and extending all around the air inlet lip and which is configured to be fed with a heat transfer fluid heated by a heat source.

Thus, the pipeline is away from the wall and is no longer integrated, which facilitates maintenance and makes it possible to separate the two elements.

Advantageously, at least one or each pipeline is equipped with fins oriented towards the outside of the pipeline and which dip into the inner chamber.

Advantageously, the inner wall has a part which has its upstream face oriented towards the air inlet stream, and the free ends of the fins are oriented towards the air inlet stream.

The invention also proposes an aircraft engine comprising a core, a heat source, a nacelle which surrounds the core and at the front of which is arranged an air inlet lip according to one of the preceding variants, an intake pipeline connected between an end of the pipeline and the heat source, and a return pipeline connected between another end of the pipeline and the heat source.

The invention also proposes an aircraft comprising at least one engine according to the preceding variant.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED DESCRIPTION

Figure 1:
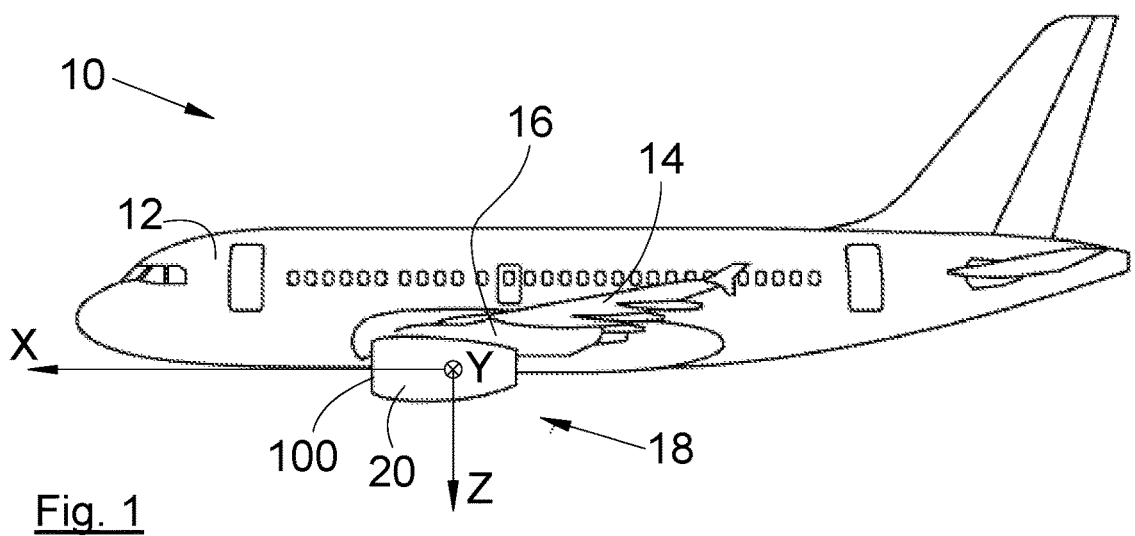
FIG. 1 shows a side view of an aircraft according to an embodiment of the invention.

FIG. 1 shows an aircraft 10 which has a fuselage 12 on either side of which is fixed a wing 14 with bears a pylon 16 under which is attached an engine 18, in particular a jet engine.

In the following description, and by convention, X will denote the longitudinal axis of the engine 18 oriented positively in the direction of advance of the aircraft 10, Y denotes the transverse direction of the engine 18 which is horizontal when the aircraft is on the ground, and Z denotes the vertical direction or vertical height when the aircraft is on the ground, these three directions X, Y and Z being mutually orthogonal.

In the embodiment of the invention presented in FIG. 1, the aircraft 10 comprises an engine 18 under each wing 14, but it is possible to provide several engines under each wing 14.

The engine 18 comprises a core and a nacelle 20 which surrounds the core and at the front of which is arranged an air inlet lip 100 which delimits an air inlet stream 22. The core is the part of the engine 18 in which the propulsion of the aircraft 10 is generated.

Figure 2:
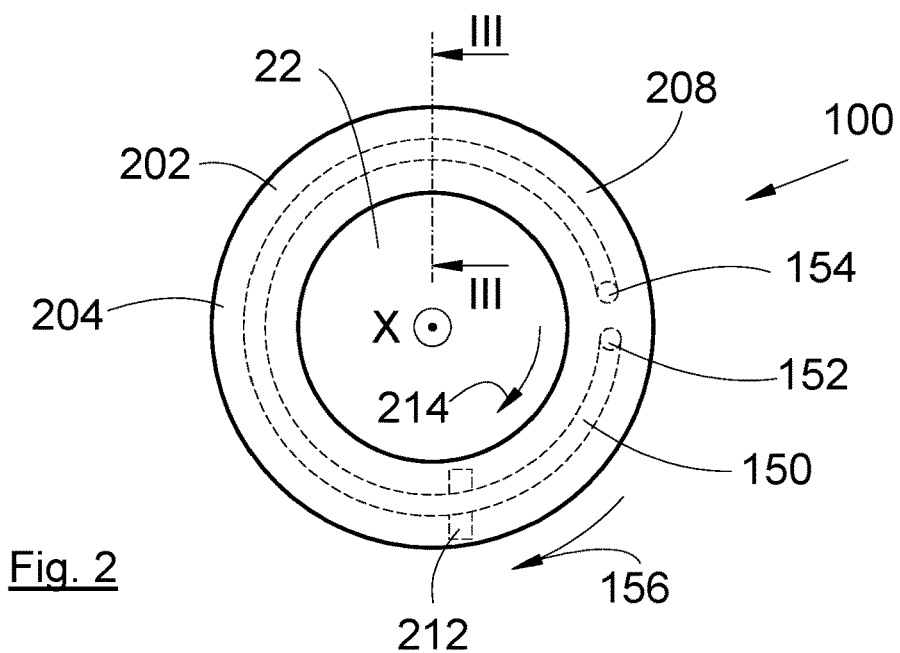
FIG. 2 shows a schematic front view of an air inlet lip according to an embodiment of the invention.

FIG. 2 shows a front view of the air inlet lip 100 which takes an annular form about the longitudinal axis X and which guides a part of the outside air upstream around the nacelle 20, and another part of the outside air upstream towards the air inlet stream 22 in order to feed the core.

Figure 3:
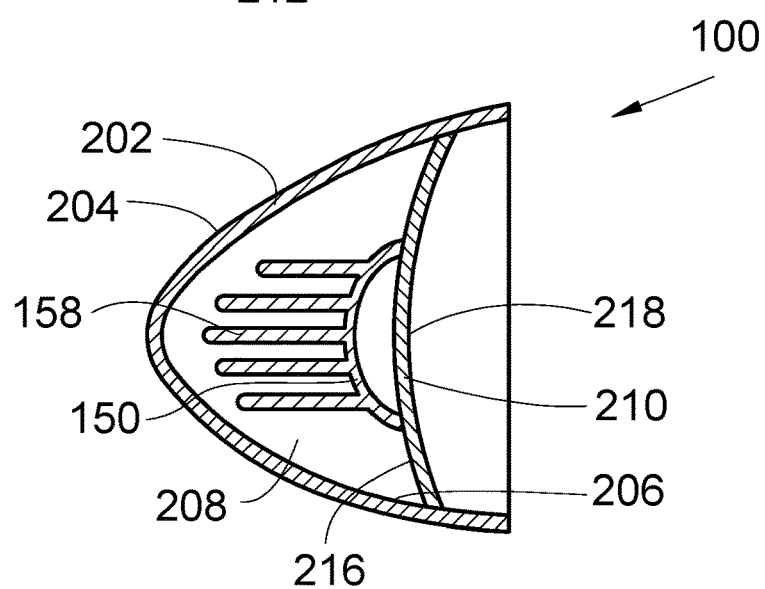
FIG. 3 shows a side and cross-sectional view of the air inlet lip according to line III-III of FIG. 2.

FIG. 3 shows a cross section of the air inlet lip 100.

The air inlet lip 100 comprises a wall 202 having a U-shaped profile whose aperture is oriented towards the rear of the aircraft 10 and whose bottom oriented towards the front forms the leading edge of the air inlet lip 100.

The wall 202 has an outer face 204 oriented towards the outside of the air inlet lip 100 and in contact with the outside air, and an inner face 206 oriented towards the interior of the air inlet lip 100. The wall 202 thus delimits an inner chamber 208.

The air inlet lip 100 also comprises an inner wall 210 which extends inside the wall 202 between two zones of the inner face 206, so as to close the inner chamber 208. The inner chamber 208 is thus delimited between the U-shaped wall 202 and the inner wall 210. The inner wall 210 extends all around the air inlet lip 100.

The inner chamber 208 is preferably sealed and filled with a gas, for example air.

The air inlet lip 100 is also equipped with a fan 212 which is configured to move the gas contained in the inner chamber 208. The fan 212 thus creates a displacement of the gas inside the inner chamber 208, here in the direction of the arrow 214. The heat exchange is consequently uniform in all of the lip.

The inner wall 210 has an upstream face 216 oriented towards the front of the aircraft 10 and towards the inner chamber 208, and a downstream face 218 oriented towards the rear of the aircraft 10 and away from the inner chamber 208.

The air inlet lip 100 also comprises at least one pipeline 150 which is fixed to the upstream face 216 and which is fed with a heat transfer fluid, preferably a liquid. The heat transfer fluid is heated by a heat source of the engine 18, such as, for example, the compression stages of the core, and is transported to the pipeline 150 where it circulates. The pipeline 150 is thus connected, at one of its ends, to an intake pipeline 152 of the engine 18 through which the heat transfer fluid arrives hot in the pipeline 150 from the heat source, and, at the other of its ends, to a return pipeline 154 of the engine 18, which conducts the heat transfer fluid back from the pipeline 150 to the heat source. The displacement of the heat transfer fluid is created for example by the inclusion of a pump. The intake pipeline 152 is thus connected between an end of the pipeline 150 and the heat source, and the return pipeline 154 is thus connected between the other end of the pipeline 150 and the heat source. The heat transfer fluid thus circulates in a closed circuit.

In the embodiment of the invention presented in FIG. 2, the heat transfer fluid circulates in the pipeline 150 in the direction of the arrow 156.

Here, the displacements of the gas in the inner chamber 208 and of the heat transfer fluid in the pipeline 150 take place in the same direction. However, it is possible to circulate the gas and the heat transfer fluid in opposite directions.

The pipeline 150 which is fixed to the inner wall 210 extends between its two ends all around the air inlet lip 100.

Thus, the heat transfer fluid which circulates in the pipeline 150 heats the gas which circulates in the inner chamber 208 which, in turn, heats the wall 202, thus preventing the formation of ice.

The placement of the pipeline 150 against the inner wall 210 makes it possible to separate the pipeline 150 from the wall 202 and therefore, if necessary, it is possible to change the wall 202 independently of the pipeline 150 and vice versa.

Such a placement also makes it possible to leave a certain distance between the wall 202 and the pipeline 150 which avoids the risks of deformation of the latter in case of impact against the wall 202, which guarantees an optimal operation of the de-icing system even when the wall 202 is deformed.

The pipeline 150 thus acts as a heat exchanger between the heat transfer fluid and the gas. The material of the pipeline 150 is then chosen to optimize this transfer of heat, and consists of a thermally conductive material, such as, for example, an aluminium alloy.

In order to enhance the heat transfer between the heat transfer fluid and the gas through the pipeline 150, the latter is equipped with fins 158 which are oriented towards the outside of the pipeline 150 and which dip into the inner chamber 208. The fins 158 are produced in a material ensuring a good transfer of heat. According to a particular embodiment, the fins 158 are of a piece with the pipeline 150. According to another embodiment, the fins 158 are elements added and fixed to the pipeline 150.

The free ends of the fins 158 are oriented preferentially towards the zone to be reheated.

In one embodiment, the inner wall of the lip 202 is all or partly covered with rough surfaces or fins, thus increasing the exchange surface between the lip 202 and the inner chamber 208. The rough surfaces or fins can be distributed over the inner surface of the lip 202 non-uniformly, so as to promote the heat exchanges in certain parts of the lip. It is thus possible to neutralize the non-uniform cooling down of the lip by the outside air due to a flow of outside air over the outer surface of the lip 204 during the flight of the aircraft.

In the embodiment of FIG. 3, the zone to be preferentially preheated is the bottom of the wall 202, that is to say the zone around the leading edge and the fins 158 then extending horizontally.

Figure 4:
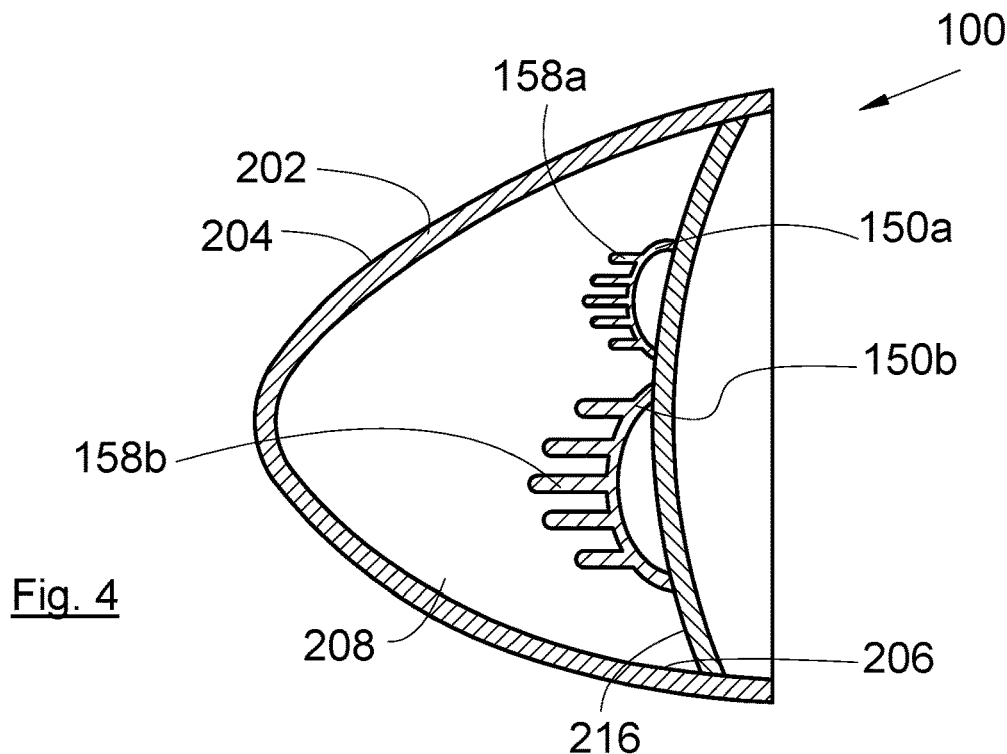
FIG. 4 shows a view identical to that of FIG. 3 for another embodiment of the invention.
Figure 5:
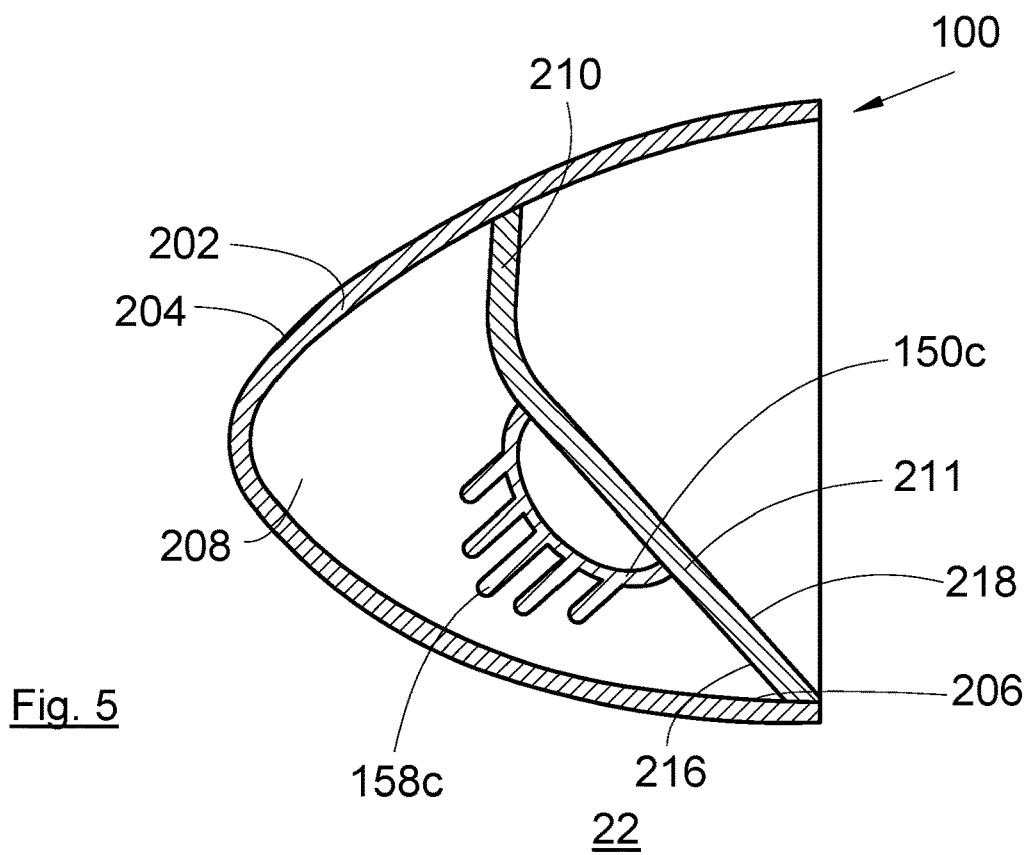
FIG. 5 shows a view identical to that of FIG. 3 for yet another embodiment of the invention.

FIG. 4 and FIG. 5 are variant embodiments of the invention.

In the embodiment of FIG. 4, two pipelines 150a-b are fixed to the upstream face and are supplied with a heat transfer fluid in order to ensure a heat transfer over a greater surface of the section of the inner chamber 208. Fins 158a-b can also be installed to enhance the heat transfer.

In the embodiment of FIG. 5, the inner wall 210 has a part 211 which has its upstream face 216 oriented towards the front of the aircraft 10 and towards the longitudinal axis X, that is to say the air inlet stream 22.

The pipeline 150c is fixed to the upstream face 216 of the part 211 in order to preferentially preheat the part of the wall 202 which delimits the air inlet stream 22.

Fins 158c can also be installed to enhance the heat transfer. The free ends of the fins 158c are then oriented towards the air inlet stream 22.

In the different embodiments of the invention, the pipelines 150, 150a-c have elongate sections, but they could be circular or of other forms.

The fan 212 is powered electrically by the electrical circuit of the aircraft 10, but for energy saving, it is possible to use a thermopile which, from the temperature difference between the ambient air and the inner wall 210, generates an electrical current.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine comprising a core, a heat source, a nacelle surrounding the core and at the front of which is arranged an air inlet lip taking an annular form about a longitudinal axis X and delimiting an air inlet stream, said air inlet lip comprising:
    a wall having a U-shaped profile having an outer face oriented towards outside of the air inlet lip and an inner face oriented towards an interior of the air inlet lip;
    an inner wall extending inside the wall between two zones of the inner face, so as to close an inner chamber delimited between the wall and the inner wall and filled with a gas, the inner wall having an upstream face oriented towards the inner chamber and a downstream face oriented away from the inner chamber;
    a fan configured to move the gas contained in the inner chamber; and
    at least one pipeline fixed to the upstream face and extending all around the air inlet lip and configured to be fed with a heat transfer fluid heated by a heat source of the aircraft,
    an intake pipeline connected between an end of the at least one pipeline and the heat source; and
    a return pipeline connected between another end of the at least one pipeline and the heat source.

2. An aircraft comprising at least one engine according to claim 1.

3. The aircraft engine according to claim 1, wherein at least one or each of the at least one pipeline is equipped with fins oriented towards the outside of the pipeline and dipping into the inner chamber.

4. The aircraft engine according to claim 3, wherein the inner wall has a part having an upstream face oriented towards the air inlet stream, and
    wherein the free ends of the fins are oriented towards the air inlet stream.

5. The aircraft engine according to claim 3, wherein the fins are made in one piece with the pipeline.

6. The aircraft engine according to claim 3, wherein the fins are elements added and fixed to the pipeline.

7. The aircraft engine according to claim 3, wherein the fins are made of a material ensuring a transfer of heat.

* * * * *